United States Patent
Akahoshi et al.

(10) Patent No.: US 10,730,139 B2
(45) Date of Patent: Aug. 4, 2020

(54) LASER WELDING DEVICE AND LASER WELDING METHOD

(71) Applicant: HONDA MOTOR CO., LTD., Minato-Ku, Tokyo (JP)

(72) Inventors: Hideaki Akahoshi, Tochigi-Ken (JP); Kotaro Fujikura, Tochigi-Ken (JP); Chiyoko Nemoto, Tochigi-Ken (JP); Yuichiro Tamura, Tochigi-Ken (JP); Ken Hashimoto, Tochigi-Ken (JP)

(73) Assignee: Honda Motor Co., Ltd., Tokyo (JP)

( * ) Notice: Subject to any disclaimer, the term of this patent is extended or adjusted under 35 U.S.C. 154(b) by 469 days.

(21) Appl. No.: 15/502,034

(22) PCT Filed: Aug. 4, 2015

(86) PCT No.: PCT/JP2015/072059
§ 371 (c)(1),
(2) Date: Feb. 6, 2017

(87) PCT Pub. No.: WO2016/021586
PCT Pub. Date: Feb. 11, 2016

(65) Prior Publication Data
US 2017/0225268 A1 Aug. 10, 2017

(30) Foreign Application Priority Data
Aug. 8, 2014 (JP) .................................. 2014-162754

(51) Int. Cl.
*B23K 26/04* (2014.01)
*B23K 26/082* (2014.01)
(Continued)

(52) U.S. Cl.
CPC ............ *B23K 26/04* (2013.01); *B23K 26/048* (2013.01); *B23K 26/08* (2013.01); *B23K 26/082* (2015.10);
(Continued)

(58) Field of Classification Search
CPC .... B23K 26/04; B23K 26/042; B23K 26/046; B23K 26/048; B23K 26/08; B23K 26/082;
(Continued)

(56) References Cited

U.S. PATENT DOCUMENTS

2006/0163221 A1* 7/2006 Makase .................. B23K 26/08
219/121.64
2008/0245776 A1* 10/2008 Oda .................... B23K 26/0608
219/121.63
(Continued)

FOREIGN PATENT DOCUMENTS

JP 54-116356 A 9/1979
JP 61-202788 A 9/1986
(Continued)

OTHER PUBLICATIONS

Office Action with search report dated Nov. 30, 2017 issued over the corresponding Chinese Patent Application No. 201580042466.0 with the English translation of pertinent portion.
(Continued)

*Primary Examiner* — Ibrahime A Abraham
*Assistant Examiner* — Justin C Dodson
(74) *Attorney, Agent, or Firm* — Carrier Blackman & Associates, P.C.; Joseph P. Carrier; William D. Blackman

(57) ABSTRACT

This laser irradiation mechanism includes a control unit which has a function allowing the focal point of a laser beam to describe a circle, performs control such that the focal point describes a spiral, and performs control such that the central axis of the spiral moves along a curved surface.

3 Claims, 9 Drawing Sheets

(51) Int. Cl.
  *B23K 26/08* (2014.01)
  *B23K 26/32* (2014.01)
  *B23K 37/04* (2006.01)
  *B23K 26/244* (2014.01)
  *B23K 26/282* (2014.01)
  *B23K 101/06* (2006.01)
  *B23K 103/04* (2006.01)
  *B23K 103/10* (2006.01)
  *B23K 103/14* (2006.01)
  *B23K 101/10* (2006.01)

(52) U.S. Cl.
  CPC ........ *B23K 26/0869* (2013.01); *B23K 26/244* (2015.10); *B23K 26/282* (2015.10); *B23K 26/32* (2013.01); *B23K 37/0443* (2013.01); *B23K 2101/06* (2018.08); *B23K 2101/10* (2018.08); *B23K 2103/04* (2018.08); *B23K 2103/05* (2018.08); *B23K 2103/10* (2018.08); *B23K 2103/14* (2018.08)

(58) Field of Classification Search
  CPC ............ B23K 26/0869; B23K 26/0876; B23K 26/0884; B23K 26/244; B23K 26/282; B23K 26/32; B23K 37/0443
  USPC .............. 219/121.6, 121.61, 121.62, 121.63, 219/121.64, 121.65, 121.66, 121.67, 219/121.78, 121.79, 121.81, 121.82
  See application file for complete search history.

(56) References Cited

U.S. PATENT DOCUMENTS

2008/0245777 A1* 10/2008 Cremerius ............. B23K 26/08
  219/121.64
2013/0087538 A1* 4/2013 Walter ................... B23K 26/24
  219/121.62

FOREIGN PATENT DOCUMENTS

JP    10-71480 A    3/1998
JP    11-000776 A   1/1999

OTHER PUBLICATIONS

International Search Report from PCT/JP2015/072059 with the English translation thereof.

* cited by examiner

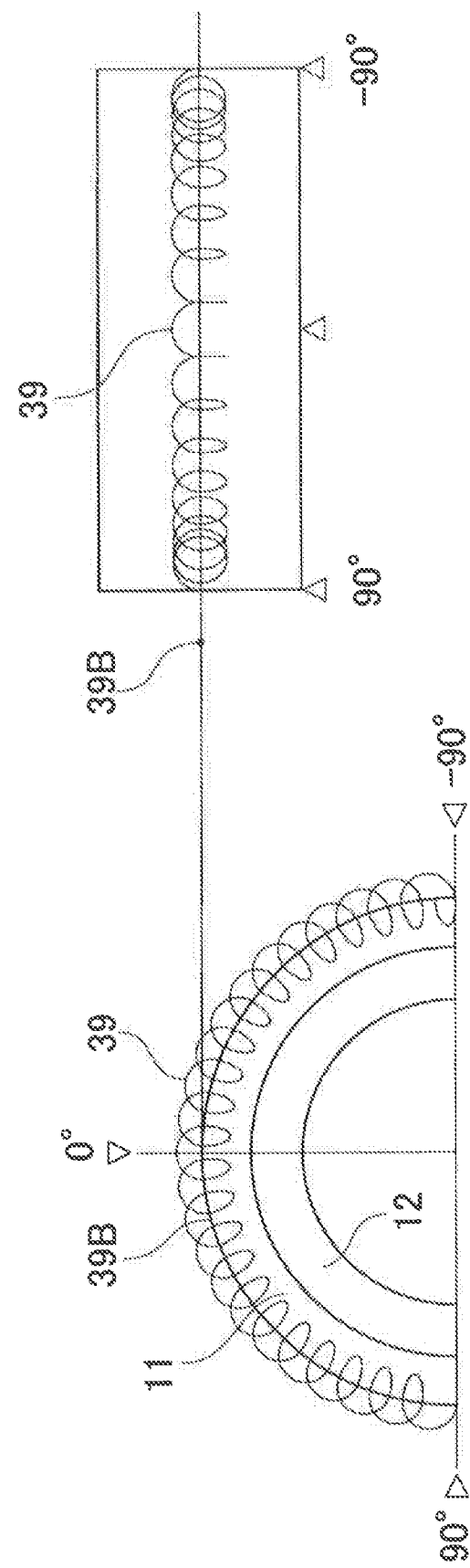

FIG. 5A
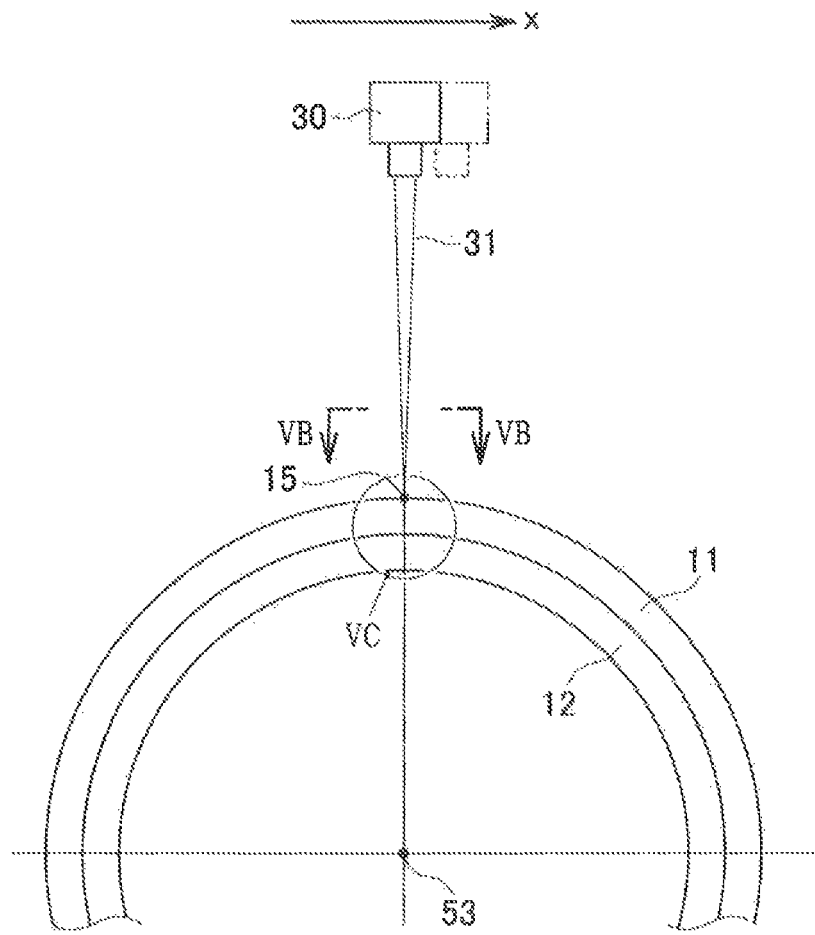
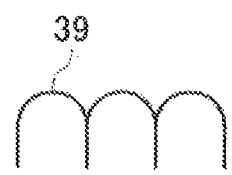
FIG. 5B
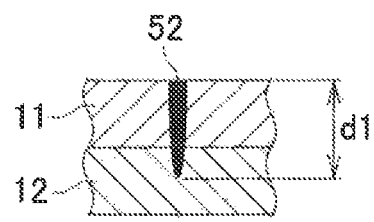
FIG. 5C

FIG. 8A
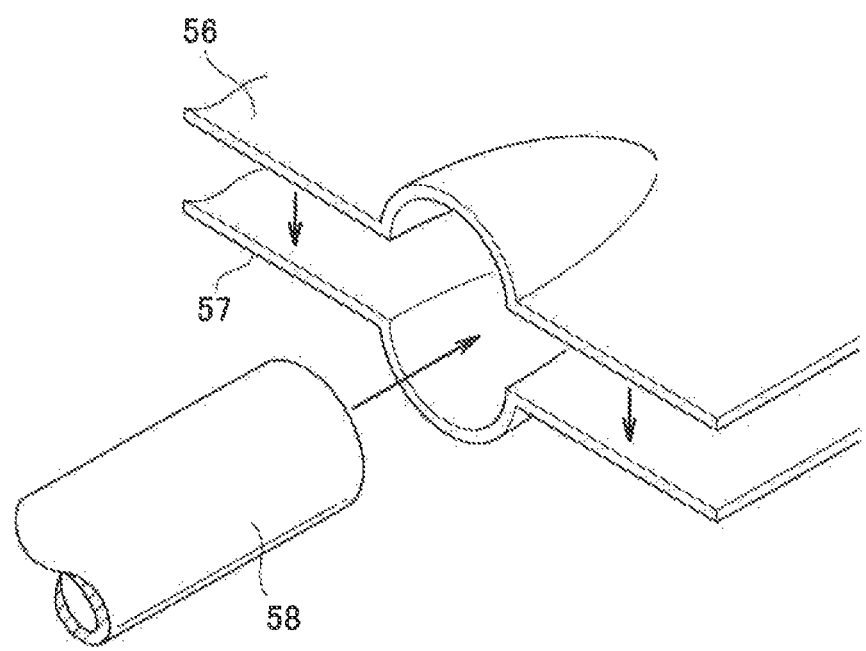
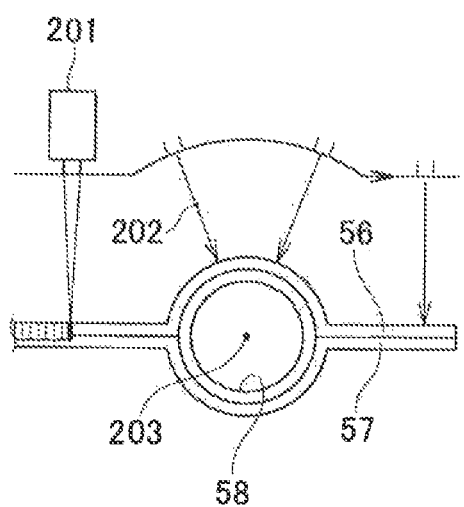
FIG. 8B
COMPARATIVE EXAMPLE
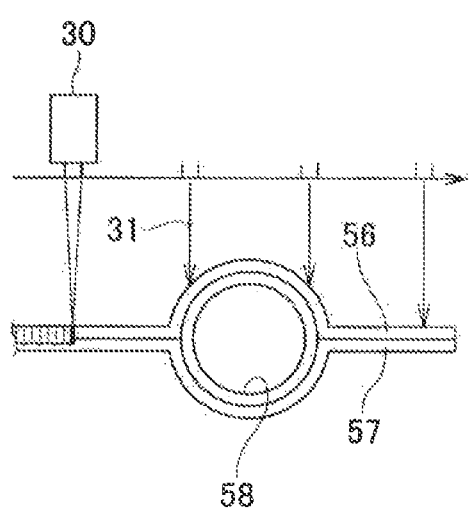
FIG. 8C
EXEMPLARY EMBODIMENT

LASER WELDING DEVICE AND LASER WELDING METHOD

TECHNICAL FIELD

The present invention relates to a laser welding device and a laser welding method.

BACKGROUND ART

A second member is placed in abutment against a first member. An abutment site between the members is welded. From the conventional art, it is widely known to carry out such welding in order to unite the two members in an integral manner.

In carrying out welding, in recent years, a laser beam with high energy density has been used.

With such a laser beam, a technique is known in which curved surfaces are welded together (for example, refer to Patent Document 1).

The technique of Patent Document 1 will be described with reference to FIG. 9.

As shown in FIG. 9, two steel pipes 101, 101 are oriented in front and rear directions of the drawing and are placed together in abutment. The steel pipes 101 are surrounded by an annular guide rail 102. A processing head 103 is mounted movably on the guide rail 102. A laser gun 104 is mounted on the processing head 103 so as to face toward a center 105 of the steel pipes 101. While the processing head 103 is moved along the guide rail 102, a laser beam is irradiated from the laser gun 104 and laser welding is carried out.

The laser beam is irradiated perpendicularly to the curved surface, and therefore, high quality welding can be implemented with favorable weld penetration.

The processing head 103 undergoes movement. On the other hand, a laser oscillator 106 does not move. Therefore, the laser oscillator 106 and the processing head 103 are tethered together via a laser transmitting device 110 including first through third joints 107, 108, 109.

The first through third joints 107, 108, 109 are essential elements, and therefore, the laser welding device according to Patent Document 1 is complex in structure and large in size. As a result, installation costs for such welding equipment increase.

In addition, since the structure is complex, the number of constituent elements increases, and maintenance costs that occur accompanying the replacement of such components tend to rise precipitously.

While seeking a reduction in processing costs, a laser welding device has been desired, which is both simple in structure and small in scale, even in the case of a device that enables welding of curved surfaces.

PRIOR ART DOCUMENTS

Patent Documents

Patent Document 1: Japanese Laid-Open Patent Publication No. 11-000776

SUMMARY OF INVENTION

Tasked to be Solved by the Invention

The present invention has the object of providing a laser welding device which is both simple in structure and small in scale, even for a device in which curved surfaces are welded.

Solution for the Task

The invention according to claim 1 is a laser welding device, comprising a workpiece fixing unit that superimposes a plurality of workpieces in such a manner that a curved surface of a first workpiece is placed in contact with a curved surface of a second workpiece, and constrains the workpieces in such a state, the workpiece fixing unit pressing the plurality of workpieces in a state with the curved surfaces thereof in abutment;

a laser irradiation mechanism that irradiates a laser beam on welding sites of the workpieces, a moving mechanism that moves the laser irradiation mechanism linearly, and a control unit that controls the laser irradiation mechanism and the moving mechanism;

wherein the laser irradiation mechanism includes a function of drawing a focal point of the laser beam in the form of a circle; and the control unit performs a control to draw the focal point in the form of a helix by combining movement of the moving mechanism and circular motion of the focal point by the laser irradiation mechanism, and performs a control so that a central axis of the helix is formed along the curved surface.

The invention according to claim 2 is a laser welding method that is implemented using the laser welding device of claim 1, wherein, when the laser beam passes through an apex of the curved surface, the control unit causes the laser beam to be perpendicular to a tangent line that passes through the apex, and causes the laser beam to incline toward a center of curvature of the curved surface at welding sites that are distanced from the apex of the curved surface.

Effect of the Invention

With the invention according to claim 1, the focal point of the laser beam is drawn in the form of a helix, and a central axis of the helix is formed along the curved surface. The helix overlaps itself at locations distanced from the apex of the curved surfaces in the workpieces. When performed in this manner, a semi-solidified portion is re-melted, and the re-melted portion becomes a semi-solidified portion, and by repeating the re-melting of the semi-solidified portion again and again, the melting depth increases. Thus, even at ends of the curved surface, a sufficient melting depth can be obtained.

According to the present invention, despite the welding sites existing on a curved surface, the laser irradiation mechanism can be moved linearly. Due to such linear motion, the moving mechanism is simplified and is small in scale. Thus, by the present invention, a laser welding device is provided, which is both simple in structure and small in scale, even for a device in which curved surfaces are welded.

With the invention according to claim 2, when the laser beam passes through an apex of the curved surface, the control unit causes the laser beam to be perpendicular to a tangent line that passes through the apex, and causes the laser beam to incline toward a center of curvature of the curved surface at welding sites that are distanced from the apex of the curved surface. The laser irradiation mechanism includes a function to cause the laser beam to incline if the laser beam resides within a fixed range. By utilizing this function skillfully, the laser beam is made to incline toward the center of curvature of the curved surface at welding sites that are distanced from the apex of the curved surface. Owing to such inclination, the overlapping of the helix with itself can be mitigated, and productivity can be enhanced.

BRIEF DESCRIPTION OF DRAWINGS

FIG. 4 is a view showing a trajectory of a focal point of a laser beam;

FIG. 5 is a descriptive view of operations at a time that the laser beam passes through an apex of a curved surface;

FIG. 8 is a diagram for describing a comparison between a comparative example and an exemplary embodiment;

BEST MODE FOR CARRYING OUT THE INVENTION

An embodiment of the present invention will be described below with reference to the accompanying drawings.

Embodiment

Figure 1:
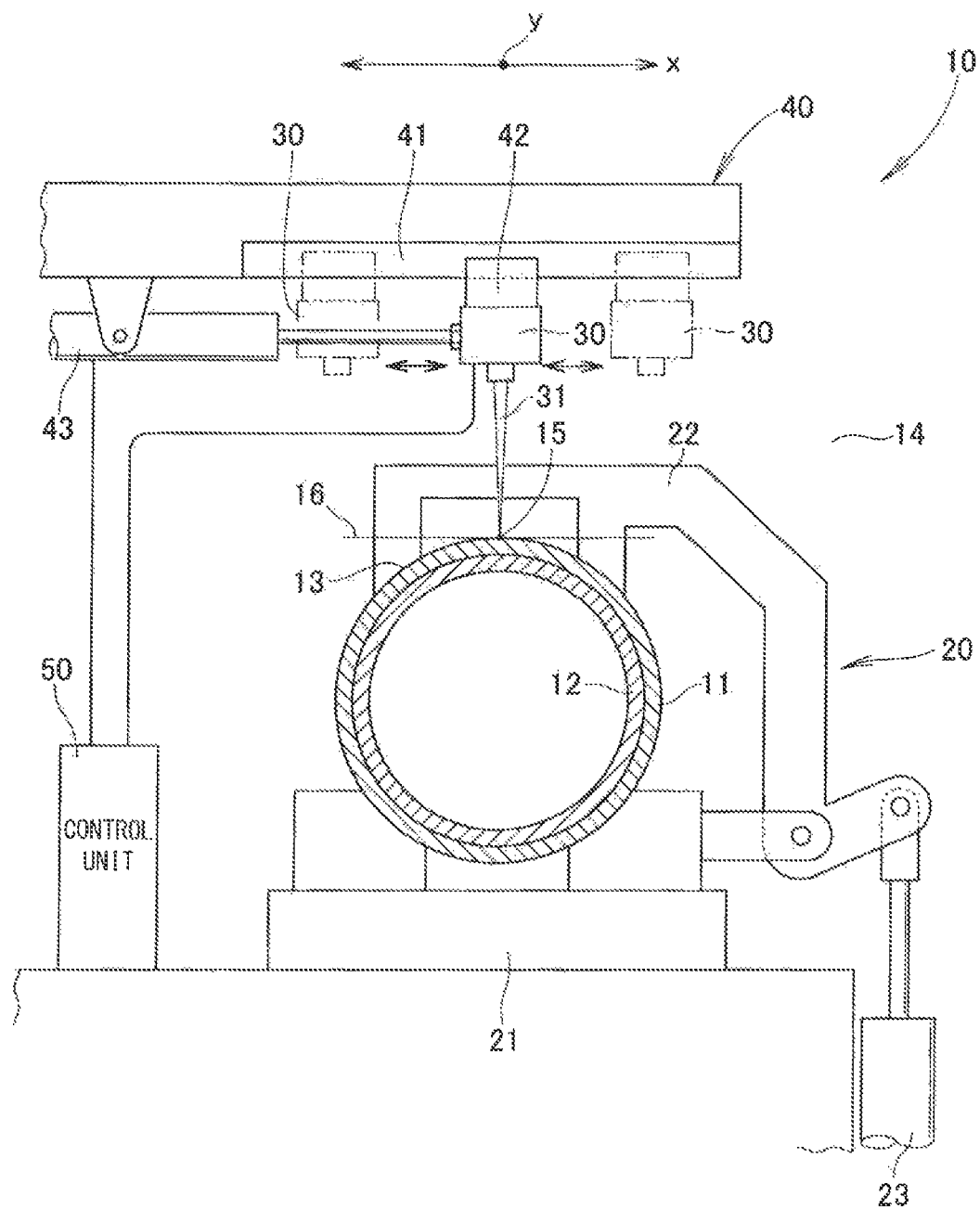
FIG. 1 is a basic schematic structural view of a laser welding device according to the present invention.

As shown in FIG. 1, a laser welding device 10 comprises a workpiece fixing unit 20 that presses and fixes workpieces 11, 12, a laser irradiation mechanism 30 that irradiates a laser beam 31 toward the workpieces 11, 12, a moving mechanism 40 that moves the laser irradiation mechanism 30 linearly, and a control unit 50 that serves to control the laser irradiation mechanism 30 and the moving mechanism 40. Below, an example of a configuration of the respective constituent elements will be described.

The workpieces 11, 12 are constituted from a cylindrical first workpiece 11, and a cylindrical second workpiece 12 that is inserted into the first workpiece 11. A curves surface of the second workpiece 12 is superimposed on a curved surface of the first workpiece 11.

In the present invention, the curved surfaces are joined with each other, and welding sites 13 thereof exhibit a circular arcuate shape. A plane 14 that passes through such welding sites 13 coincides with the plane of the drawing sheet in this example.

A tangent line 16 (including lines parallel to the tangent line 16) that are on the plane 14 and passes through an apex 15 of the curved surface is defined as an x-axis. An axis that is perpendicular to the x-axis and extends to the rear of the drawing is defined as a y-axis. The y-axis is an axis that extends in a width direction of a later-described weld line.

A workpiece fixing unit 20 is constituted from a cradle 21 on which the workpieces 11, 12 are supported, and a clamp 22 that presses the workpieces 11, 12 toward the cradle 21. The clamp 22 is driven by a clamp cylinder 23.

The moving mechanism 40 is a mechanism that causes the laser irradiation mechanism 30 to move linearly along the x-axis. The moving mechanism 40, for example, is made up from a rail 41 that extends along the x-axis, a slider 42 that is supported on the rail 41 and supports the laser irradiation mechanism 30, and a moving cylinder 43 that moves the slider 42 along the x-axis.

When the workpieces 11, 12 are placed on or separated away from the workpiece fixing unit 20, the moving mechanism 40 is moved to a standby position so as not to interfere with the workpieces 11, 12. The moving mechanism 40 preferably is a robot arm.

Figure 2:
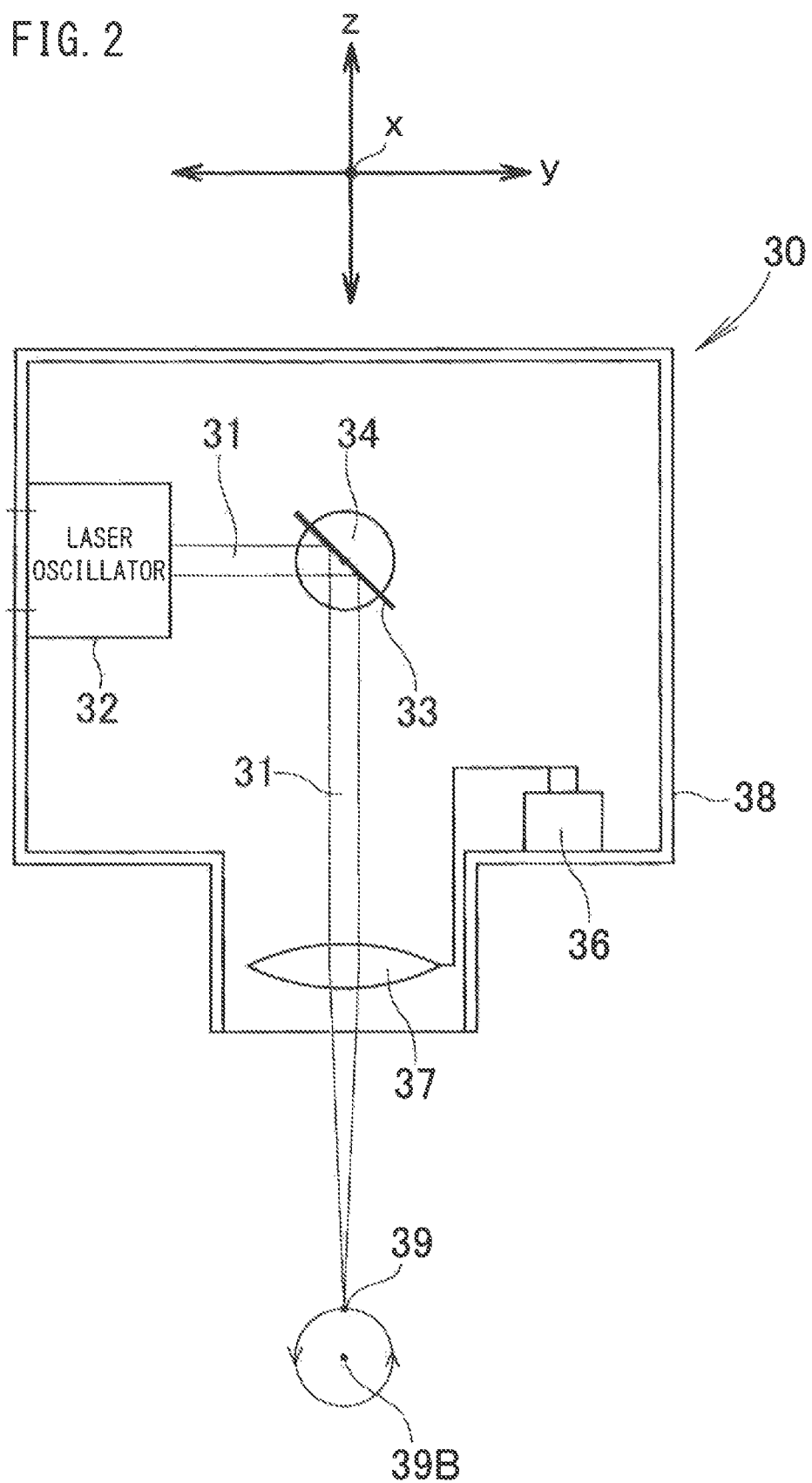
FIG. 2 is a conceptual view of the laser irradiation mechanism.

As shown in FIG. 2, the laser irradiation mechanism 30 is constituted from a laser oscillator 32, a mirror 33 that reflects the laser beam 31 irradiated from the laser oscillator 32, a motor 34 that rotates the mirror 33 about the x-axis, a lens 37 that converges the laser beam 31 reflected by the mirror 33, a lens driver 36 that causes the lens 37 to move along an axis of the lens 37, and a casing 38 in which these constituent elements are accommodated. The focal point (focus) 39 of the laser beam 31 is determined by the lens 37.

The laser beam 31 is moved along the y-axis by the mirror 33. Further, by moving the lens 37 relatively with respect to the mirror 33, the focal point 39 of the laser beam 31 is moved along the z-axis. The y-axis motion and the z-axis motion are combined so that the focal point 39 draws a circle.

Figure 3:
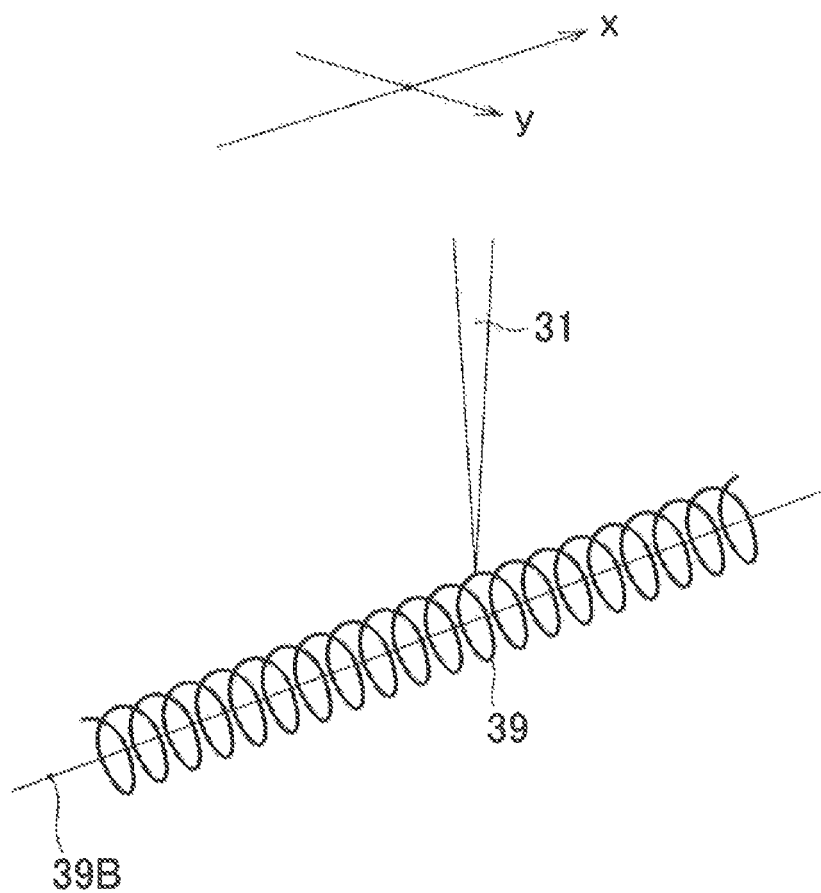
FIG. 3 is a view showing a trajectory of a focal point of a laser beam.

Upon drawing the circle, movement of the laser irradiation mechanism 30 along the x-axis is provided in addition thereto. Thus, as shown in FIG. 3, the circular motion of the focal point 39 is turned into helical motion. According to this example, in order to facilitate understanding, the central axis 39B of the helix lies along a straight line. The movement speed in the x-axis direction of the laser irradiation mechanism 30, the irradiation angle, and operations of the mirror 33 and the lens 37 are finely controlled, whereby the helical motion is drawn along a circular arc.

Thus, according to the present invention, as shown in FIG. 4(a), the central axis 39B of the helix coincides or approximately coincides with the outer circumferential surface of the first workpiece 11. FIG. 4(b) is a plan view, in which the helix that is drawn by the focal point 39 is coarsely drawn in the center, and becomes denser, and further has a large number of overlapping sections, closer to both ends (90°, −90°). Next, operations of the laser welding device 10, which is constituted in the foregoing manner, will be described.

As shown in FIG. 5(a), the laser beam 31, which is irradiated from the laser irradiation mechanism 30 during movement thereof along the x-axis, reaches an apex 15 of the curved surface.

As shown in FIG. 5(b), which is a view taken along the arrows b-b of FIG. 5(a), the focal point 39 of the laser beam draws a trajectory (a trajectory as viewed in plan) having a continuous U-shaped form.

As a result, as shown in FIG. 5(c), which is a partially enlarged view of the c portion of FIG. 5(a), a welded metal portion (bead) 52 is formed having a depth d1 that penetrates through the first workpiece 11 and reaches midway through the plate thickness of the second workpiece 12.

Figure 6A:
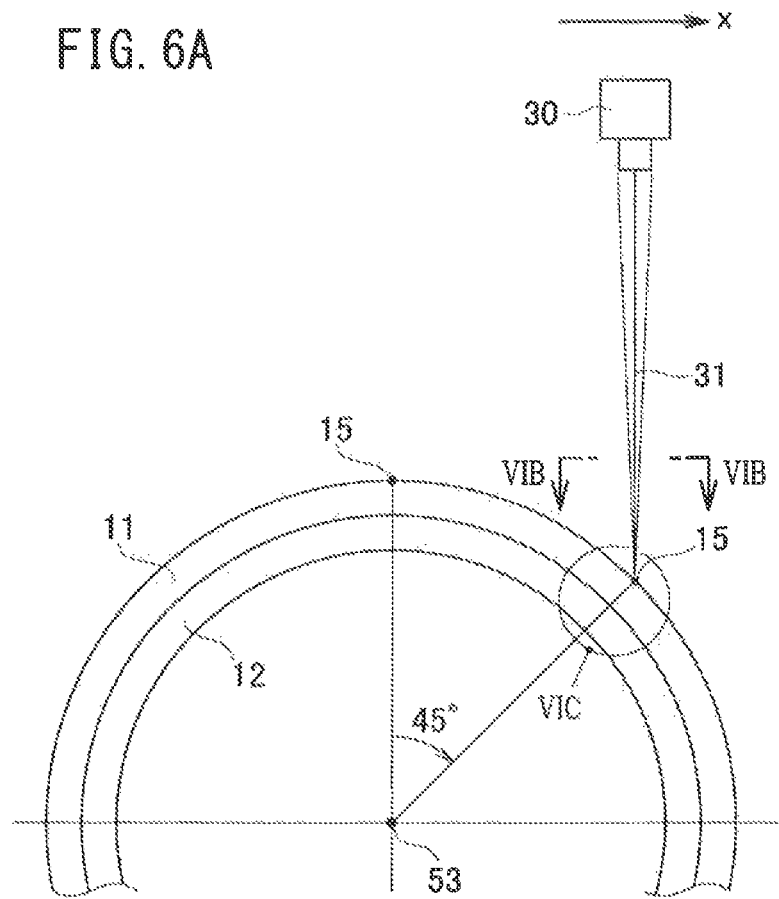
FIG. 6 is a descriptive view of operations at a time that the laser beam is separated away from the apex of the curved surface.

When the laser irradiation mechanism 30 is moved along the x-axis to a position distanced from the apex 15 of the curved surface, then as shown in FIG. 6(a), the laser beam 31 arrives at a point 45° rotated about the center of curvature 53. Thus, as shown in FIG. 6(b), the focal point 39 of the laser beam draws a helical trajectory.

In general, if the laser beam 31 is advanced continuously, at the leading end thereof, a molten portion (molten pool) referred to as a keyhole is formed. Immediately after the molten portion, a semi-solidified portion is formed, and after the semi-solidified portion, a solidified portion (corresponding to the welded metal) is formed.

Figure 6B:
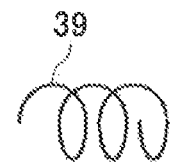

As shown in FIG. 6(b), when the focal point 39 of the laser being overlaps with itself while drawing the helical trajectory, the semi-solidified portion is re-melted by the laser beam 31.

Figure 6C:
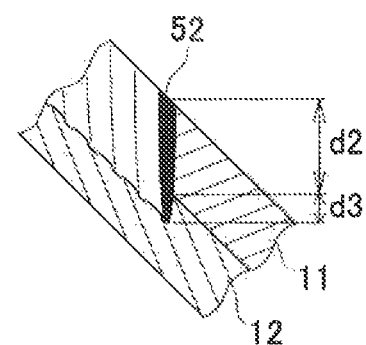

More specifically, as shown in FIG. 6(c) a depth d2 is form by an initial melting, and a depth d3 is added thereto by re-melting, and as a result, a welded metal portion 52 having a depth of (d2+d3) is formed. The welded metal portion 52 penetrates through the first workpiece 11 and reaches midway through the second workpiece 12.

As shown in FIG. 4(*b*), as the laser beam approaches the end portions of the curved surface, overlapping of the helix increases. As a result, welded metal portions of sufficient depth are formed even at the ends of the curved surface.

However, when the conventional welding method is considered in which the laser beam is oriented toward the center of curvature of the workpiece, the welding process described next may also be recommended.

Figure 7:
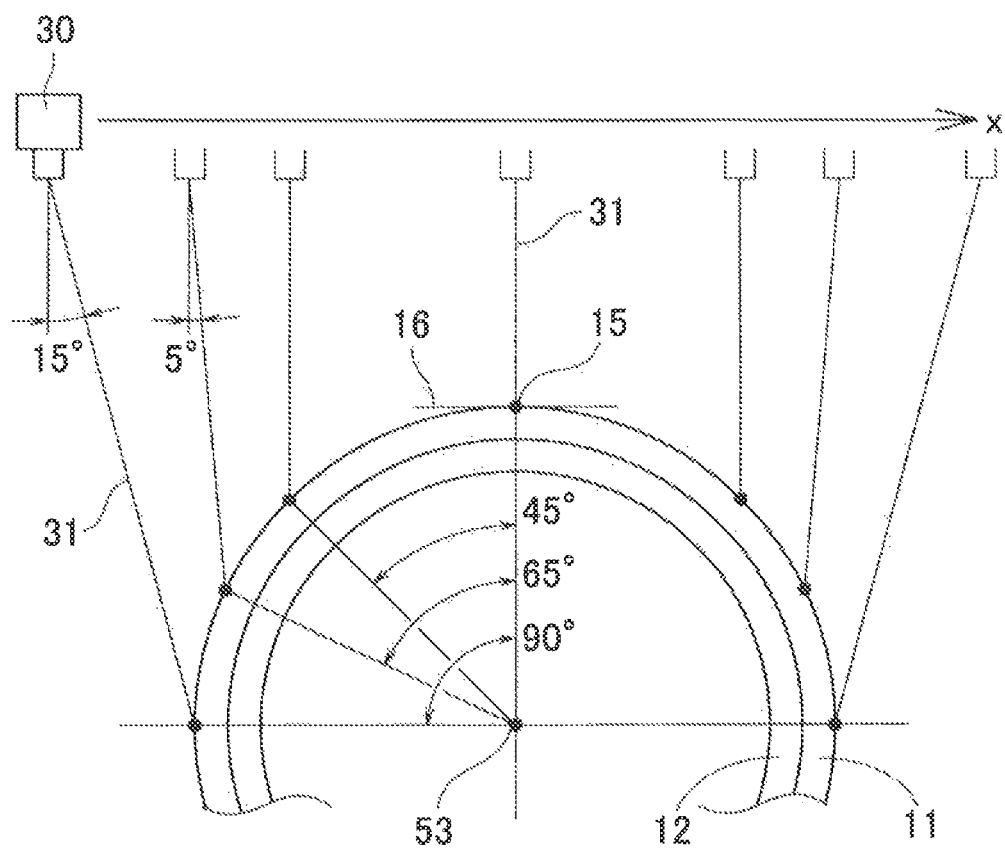
FIG. 7 is a diagram for describing a preferred method of irradiating a laser beam.
Figure 9:
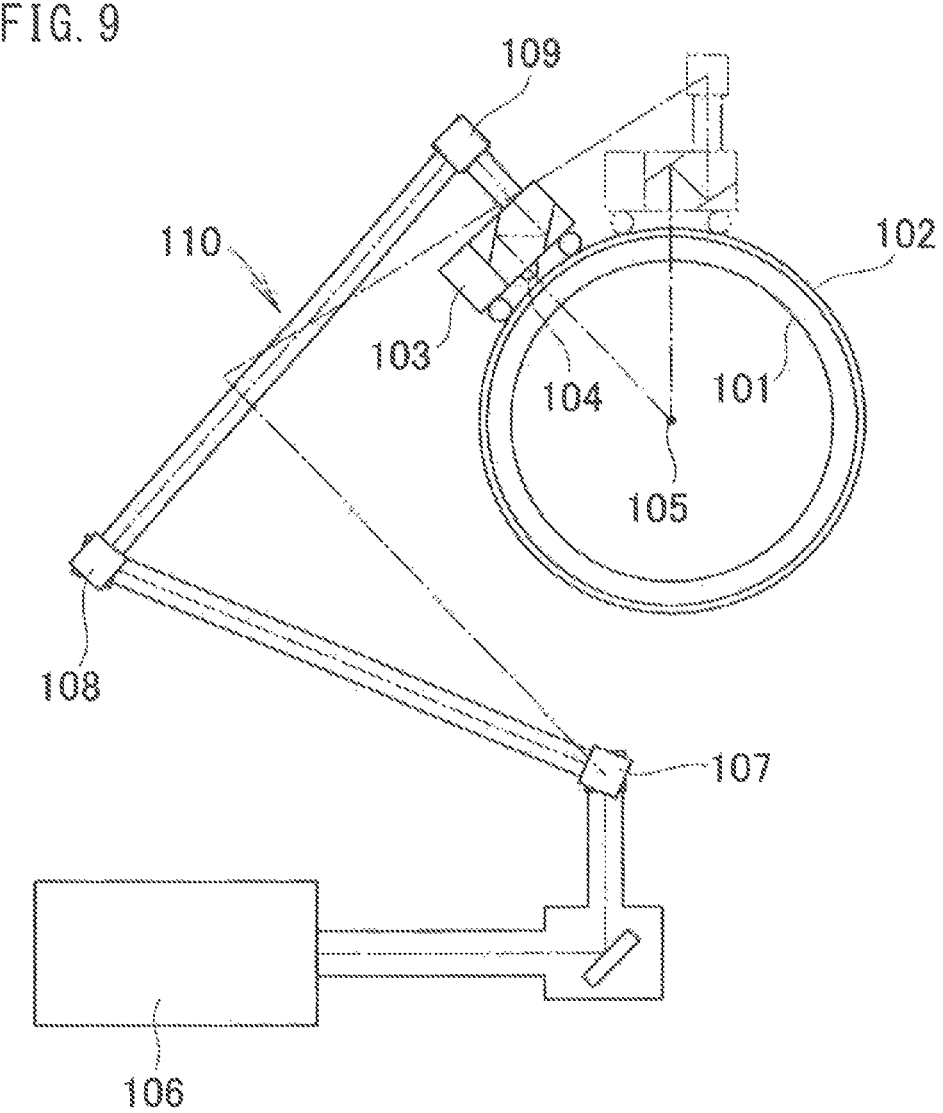
FIG. 9 is a diagram for describing principles of a conventional laser welding device.

More specifically, as shown in FIG. 7, when the laser beam 31 passes through the apex 15 of the curved surface, the laser beam 31 is perpendicular to the tangent line 16 that passes through the apex 15. When the laser beam 31 passes through welding sites that are distanced from the apex 15 of the curved surface, the laser beam 31 is made to incline at an angle of 5° to 15° toward the center of curvature 53 of the curved surface. Owing thereto, the welding quality at the ends of the curved surface can be further enhanced.

The method of the present invention can be applied to a variety of applications. One example thereof will be described next.

As shown in FIG. 8(*a*), a first pressed article 56 in which a portion of a flat plate is bent in an arcuate shape, a second pressed article 57 in which a portion of a flat plate is bent in an arcuate shape, and a pipe 58 are prepared. The pipe 58 is sandwiched between the arc of the first pressed article 56 and the arc of the second pressed article 57. The first pressed article 56 and the second pressed article 57 are welded together. The pipe 58 is welded to the first pressed article 56.

According to the conventional art, as shown by the comparative example of FIG. 8(*b*), when the first pressed article 56 and the second pressed article 57 are welded, the laser irradiation mechanism 201 is moved linearly. On the other hand, when the pipe 58 is welded to the first pressed article 56, the laser irradiation mechanism 201 is moved in a manner to draw an arc, so that the laser beam 202 is oriented toward the center 203 of the pipe 58.

The positional control of the laser irradiation mechanism 201 is cumbersome.

In contrast thereto, with the exemplary embodiment shown in FIG. 8(*c*), the laser irradiation mechanism 30 is moved linearly or in a straight line, whereby the linear portion and the arcuate portion can be welded together collectively. As a result, the positional control of the laser irradiation mechanism 30 is significantly easier.

Moreover, although in the exemplary embodiment two workpieces are superimposed, three or more workpieces may be superimposed. Further, the present invention can also be applied to butt welding.

Further, although in principle the material of the workpieces is carbon steel, stainless steel, titanium alloy, aluminum alloy, or other materials may be used.

Furthermore, the workpieces are not limited to being circular tubes or pipes, and may be arcuate members that are formed by being pressed locally such as pressed articles or the like.

INDUSTRIAL APPLICABILITY

The present invention is preferably applied to laser welding for welding curved surfaces.

DESCRIPTION OF REFERENCE NUMERALS

10 . . . laser welding device, 11 . . . workpiece (first workpiece), 12 . . . workpiece (second workpiece), 13 . . . welding sites, 14 . . . plane, 15 . . . apex, 16 . . . tangent line, 20 . . . workpiece fixing unit, 30 . . . laser irradiation mechanism, 31 . . . laser beam, 39 . . . laser beam focal point, 39B . . . central axis of helix, 40 . . . moving mechanism, 50 . . . control unit, 52 . . . welded metal portion, 53 . . . center of curvature

The invention claimed is:

1. A laser welding device comprising:
a workpiece fixing unit that is configured to superimpose a plurality of workpieces in such a manner that a curved surface of a first workpiece is placed in contact with a curved surface of a second workpiece, and is also configured to constrain the workpieces in such a state;
a laser irradiation mechanism that is configured to irradiate a laser beam on welding sites of the workpieces superimposed and constrained by the workpiece fixing unit;
a moving mechanism that moves the laser irradiation mechanism linearly; and
a control unit that is configured to concurrently control the laser irradiation mechanism and the moving mechanism;
wherein
the workpiece fixing unit includes a cradle which is configured to support the workpieces thereon,
the laser irradiation mechanism includes:
a laser oscillator;
a mirror that reflects the laser beam irradiated from the laser oscillator;
a motor that rotates the mirror about an axis parallel to a direction along which the moving mechanism moves;
a lens that converges the laser beam reflected by the mirror; and
a lens driver that causes the lens to move along an axis of the lens,
the moving mechanism includes a linear rail that movably supports the laser irradiation mechanism,
the control unit is configured to concurrently control the laser irradiation mechanism and the moving mechanism such that the moving mechanism will move the laser irradiation mechanism linearly along the rail while the motor rotates the mirror so that a focal point of the laser beam moves in form of a helix, while simultaneously the lens driver moves the lens so that a central axis of the helix formed by the focal point of the laser follows the curved surface of the first workpiece, and
the control unit is configured to concurrently control the laser irradiation mechanism and the moving mechanism such that when the workpieces are superimposed and constrained by the workpiece fixing unit with an apex of the curved surface of the first workpiece disposed closer to the linear rail than other portions of the curved surface of the first workpiece, the control unit causes the laser beam to pass through the apex of the curved surface of the first workpiece in a state perpendicular to a line that is tangent to the curved surface of the first workpiece and that also passes through the apex, and the control unit causes the laser beam to pass through the other portions of the curved surface of the first workpiece in a state inclined toward a center of curvature of the curved surface of the first workpiece.

2. A laser welding method for welding together a curved surface of a first workpiece and a curved surface of a second workpiece, comprising the steps of:

fixing the first and second workpieces in engagement together on a cradle such that the workpieces are superimposed with the curved surface of the first workpiece is placed in contact with the curved surface of a second workpiece, and the superimposed workpieces are constrained in such a state;

providing a laser irradiation mechanism that irradiates a laser beam on welding sites of the workpieces while the workpieces are fixed in engagement together;

providing a moving mechanism that moves the laser irradiation mechanism linearly; and concurrently controlling the laser irradiation mechanism and the moving mechanism to weld together the curved surfaces of the first and second workpieces while the workpieces are fixed in engagement together;

wherein the laser irradiation mechanism includes:

a laser oscillator;

a mirror that reflects the laser beam irradiated from the laser oscillator;

a motor that rotates the mirror about an axis parallel to a direction along which the moving mechanism moves;

a lens that converges the laser beam reflected by the mirror; and a lens driver that causes the lens to move along an axis of the lens, the moving mechanism includes a linear rail that movably supports the laser irradiation mechanism, the concurrently controlling step involves concurrently controlling the laser irradiation mechanism and the moving mechanism such that the moving mechanism moves the laser irradiation mechanism linearly along the rail while the motor rotates the mirror so that a focal point of the laser beam moves in form of a helix, while simultaneously controlling the lens driver to move the lens so that a central axis of the helix formed by the focal point of the laser follows the curved surface of the first workpiece, and the concurrently controlling step also involves concurrently controlling the laser irradiation mechanism and the moving mechanism such that while the workpieces are superimposed and constrained in engagement together with an apex of the curved surface of the first workpiece disposed closer to the linear rail than other portions of the curved surface of the first workpiece, the laser beam is controlled to pass through the apex of the curved surface of the first workpiece in a state perpendicular to a line that is tangent to the curved surface of the first workpiece and that also passes through the apex, and the laser beam is also controlled to pass through the other portions of the curved surface of the first workpiece in a state inclined toward a center of curvature of the curved surface of the first workpiece.

3. A laser welding method according to claim 1, wherein the second workpiece is disposed concentrically within the first workpiece.

* * * * *